(12) United States Patent
Takagi

(10) Patent No.: US 7,031,748 B2
(45) Date of Patent: Apr. 18, 2006

(54) RADIO SIGNAL RECEIVING APPARATUS AND DEMODULATING CIRCUIT

(75) Inventor: Kotaro Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 10/363,793

(22) PCT Filed: Jul. 9, 2002

(86) PCT No.: PCT/JP02/06951

§ 371 (c)(1),
(2), (4) Date: Mar. 7, 2003

(87) PCT Pub. No.: WO03/007493

PCT Pub. Date: Jan. 21, 2003

(65) Prior Publication Data

US 2003/0181174 A1    Sep. 25, 2003

(30) Foreign Application Priority Data

Jul. 13, 2001  (JP)  ............................ 2001-214189

(51) Int. Cl.
H04B 1/40  (2006.01)

(52) U.S. Cl. .................... 455/553.1; 455/209; 455/86; 455/319

(58) Field of Classification Search ............ 455/552.1, 455/553.1, 209, 84, 86, 318, 319
See application file for complete search history.

(56) References Cited

U.S. PATENT DOCUMENTS

| | | | |
|---|---|---|---|
| 5,896,562 A * | 4/1999 | Heinonen .................... | 455/76 |
| 6,029,052 A | 2/2000 | Isberg et al. | |
| 6,175,746 B1 * | 1/2001 | Nakayama et al. ...... | 455/552.1 |
| 6,201,952 B1 * | 3/2001 | Shimizu et al. .......... | 455/180.1 |
| 6,658,237 B1 * | 12/2003 | Rozenblit et al. .............. | 455/83 |
| 6,694,129 B1 * | 2/2004 | Peterzell et al. .............. | 455/76 |
| 6,735,426 B1 * | 5/2004 | Pau ............................ | 455/255 |
| 6,766,178 B1 * | 7/2004 | Damgaard et al. ....... | 455/552.1 |
| 2002/0039889 A1 | 4/2002 | Boos | |
| 2002/0039894 A1 | 4/2002 | Yoshida et al. | |
| 2002/0049075 A1 | 4/2002 | Takagi | |

FOREIGN PATENT DOCUMENTS

| AU | 199881359 | 6/1998 |
|---|---|---|
| BR | 9810376 | 6/1998 |
| CN | 1350371 | 5/2002 |

(Continued)

Primary Examiner—Edward Urban
Assistant Examiner—Adeel Haroon
(74) Attorney, Agent, or Firm—Frommer Lawrence & Haug LLP; William S. Frommer

(57) ABSTRACT

The object of this invention is to demodulate received signals having different received signal frequencies with the simple circuit configuration. With the present invention, the fixed frequency signals are generated at the fixed PLL unit 310, and simultaneously, the standard frequency signals corresponding respectively to GSM/DCS received RF signals are generated at the channel PLL unit 330. And using the image removal mixer 370 jointly to received RF signals, local oscillation signals having local oscillation frequencies equal to the received signal frequencies of the received RF signals respectively are formed from the fixed frequency signals and the standard frequency signals for receiving. And since the quadrature demodulators 254 and 264 demodulate the received RF signals using corresponding local oscillation signals respectively, the circuit configuration can be simplified by sharing the image removal mixer 370. Thereby, receiving signals having different received signal frequencies can be demodulated with the simple circuit configuration.

4 Claims, 6 Drawing Sheets

FOREIGN PATENT DOCUMENTS

| | | |
|---|---|---|
| EE | 199900606 | 12/1999 |
| EP | 0995267 | 4/2000 |
| EP | 1 102 413 | 5/2001 |
| EP | 1 148 654 | 10/2001 |
| EP | 1 184 970 | 3/2002 |
| EP | 1 217 756 | 6/2002 |
| JP | 2001-211098 | 8/2001 |
| JP | 2001-358607 | 12/2001 |
| JP | 2002-64397 | 2/2002 |
| JP | 2002-135157 | 5/2002 |
| NO | 19996283 | 12/1999 |
| NO | 2000 5772 | 11/2000 |
| WO | WO 99/01933 | 1/1999 |

\* cited by examiner

RADIO SIGNAL RECEIVING APPARATUS AND DEMODULATING CIRCUIT

TECHNICAL FIELD

The present invention relates to a wireless signal receiving device and a demodulation processing circuit and is suitably applied to such as mobile telephone equipment capable of using two or more kinds of wireless communication systems using different frequency bands at the same time.

BACKGROUND ART

Heretofore, as a signal receiving system to be applied to mobile telephone equipment, superheterodyne system has been widely used. This superheterodyne system is so defined that the frequency of a received RF (Radio Frequency) signal (hereinafter referred to as a received signal frequency) is converted to a different intermediate frequency (IF) for the receiving and processing purpose.

However, when the superheterodyne system is applied to a mobile telephone, it is necessary to provide a circuit element, which is difficult to be IC (Integrated Circuit) chipped, such as a filter for temporarily converting the received signal frequency to the intermediate frequency in a signal receiving processing circuit. Thus, this superheterodyne system shows a tendency that the circuit scale of the signal receiving processing circuit becomes relatively large sized.

Thus, recently it has been proposed to apply the signal receiving system called as a direct conversion system(hereinafter referred to as DCR) to the mobile telephone equipment. This DCR system has an advantage that the signal receiving processing circuit can be configured without any circuit element, such as the filter for the frequency conversion by conducting the signal receiving processing by not changing the received signal frequency of the received RF signal.

Moreover, with the rapid popularization of the mobile telephone equipment in recent years, the number of communication lines that one wireless communication system can keep is becoming insufficient, and multiple kinds of wireless communication systems using different frequency bands have been started.

Thus, in recent years, mobile telephone equipment capable of using multiple kinds of wireless communication systems, such as GSM (Global System for Mobile Communications) adopting a wireless communication system called as TDMA (Time Division Multiple Access) system and using 900 [MHz] band wireless communication frequency, DCS (Digital Cellular System) adopting TDMA system and using 1.8 [GHz] band wireless communication frequency, and UMTS (Universal Mobile Telecommunications system) using 2 [GHz] band wireless communication frequency adopting a wireless communications system called as W-CDMA (Wideband-Code Division Multiple Access) system has been considered (hereinafter this mobile telephone equipment is referred to as a multi-band mobile telephone).

Furthermore, in this multi-band mobile telephone, it is required to provide signal receiving processing circuits corresponding to GSM, DCS and UMTS respectively. Thus, it is considered that applying the DCR system to the multi-band mobile telephone allows this multi-band mobile telephone smaller sized and lighter weighted.

By the way, in a narrow-band digital conversion system used for GSM and DCS, a circuit for suppressing DC offset by a DC feedback cannot be used when the DC offset component generated by DCR is put out to a receiver detection output (i.e., baseband (BB) signal).

The reason is that when such controlling circuit is used, the low band of the frequency is cut out and a part of demodulation signal data is dropped.

FIG. 4 is a Figure for explaining the DC offset generation mechanism in DCR. In the signal receiving processing circuit of DCR, the received RF signal is directly quadrature demodulated using the local oscillation signal of local oscillation frequency ($f_{LO}$) equal to the received signal frequency ($f_{RF}$), and the baseband signals I and Q quadrature each other are obtained.

However, at the same time, resulting from the fact that the received signal frequency and the local oscillation frequency are equal, the local oscillation signal is leaked out to the other part of the circuit via the passage shown by a broken line in FIG. 4, and because of non-linear characteristic of each circuit the local oscillation signal is mixed with the received RF signal (this is called as self-mixing). As a result, the DC component is overlapped onto the I/Q outputs of the baseband (BB).

This DC component is unnecessary component for the baseband data, and is considered equivalent to noise.

Moreover, in the leakage passage of the local oscillation signal, there are such passages as a local oscillation signal entering into the input unit of the received RF signal through the other circuit block via a substrate forming the receiving chip, entering into a signal on a print substrate being equipped with the chip, and a local oscillation signal jumping into the antenna via space and mixed up with the received RF signal.

Then, the DC component is generated when the leakage of the local oscillation signal through these multiple leakage passages occurs alone or combined.

Furthermore, when the DC offset component is too large, the offset component is overlapped onto a DC bias voltage of the circuit. As a result, the operation point becomes a power source or a grounding potential, which could be cause of mis-operation.

Because of the above reasons, there are few examples where DCR has been put into a practical use. Even an existing practical usage is only applied to a system in which a demodulation of the DC component is not required, that is the system using the modulation system in which the DC offset compensation by said DC feedback is possible.

Therefore, in the system using the narrow band modulation such as GSM and DCS, it becomes necessary to prevent the local oscillation signal from entering into the RF input.

At this point, regarding the multi-band mobile telephone, the circuit configuration of the signal receiving processing circuit for realizing DCR is explained as follows.

More specifically, as shown in FIG. 5, the signal receiving processing circuit 1 comprises a quadrature demodulation unit 2 for directly quadrature demodulating the received RF signal using the local oscillation frequency equal to the received signal frequency and a frequency generating unit 3 for generating the local oscillation frequency.

Then, this signal receiving processing circuit 1 operates by switching among the GSM mode, the DCS mode, and the UMTS mode according to GSM, DCS, and UMTS. Thus, the received RF signals of GSM, DCS and UMTS are quadrature demodulated respectively.

In the GSM mode, when the received RF signal transmitted from a base station for GSM (not shown in Figures) is received by an antenna element (not shown in Figures), the signal receiving processing circuit 1 feeds that received RF signal into a variable gain low-noise amplifier for GSM 10 in the quadrature demodulation unit 2.

The received RF signal, after being amplified at the variable gain low-noise amplifier 10, is put into a quadrature demodulator 14 comprised of frequency mixers 11, 12 and a polyphase filter 13, and is multiplied by the local oscillation frequency. Here, DCR is realized by equalizing the local oscillation frequency to the received RF signal.

As a result, the I/Q quadrature baseband (BB) signals are obtained from the outputs of the frequency mixers 11 and 12, and said quadrature baseband signals are transmitted to the received-signal baseband processing unit (not shown in Figures) of the later stage.

Furthermore, in the DCS mode, when the received RF signal transmitted from the base station for DCS (not shown in Figures) is received by the antenna element, the signal receiving processing circuit 1 feeds the received RF signal into a variable gain low-noise amplifier for DCS 20.

The received RF signal, after being amplified at the variable gain low-noise amplifier 20, is put into a quadrature demodulator 24 comprised of frequency mixers 21 and 22 and a polyphase filter 23, and then, is multiplied by the local oscillation frequency equal to the received signal frequency.

As a result, I/Q quadrature baseband (BB) signals are obtained from the outputs of the frequency mixers 21 and 22, and are transmitted to the received-signal baseband processing unit (not shown in Figures) of the later stage.

Furthermore, in the UMT mode, when the received RF signal transmitted from a base station for UMTS (not shown in Figures) is received by the antenna element, the signal receiving processing circuit 1 feeds the received RF signal into a variable gain low-noise amplifier for UMTS 30.

The received RF signal, after being amplified at the variable gain low-noise amplifier 30, is put into a quadrature demodulator 34 comprised of frequency mixers 31 and 32 and a polyphase filter 33, and then, is multiplied by the local oscillation frequency equal to the received signal frequency.

As a result, I/Q quadrature baseband (BB) signals are obtained from outputs of the frequency mixers 31 and 32, and is transmitted to the received-signal baseband processing unit (not shown in Figures).

At this point, in the GSM mode, a channel PLL (Phase-Locked Loop) unit 40 outputs a frequency signal of a predetermined oscillation frequency in a voltage controlled oscillator for GSM 41 and feeds it into an output frequency divider 42. Then, the frequency signal, after being frequency divided by the output frequency divider 42, is put into the channel PLL 43 as an output frequency divided signal.

Furthermore, the channel PLL unit 40 captures the standard frequency signal of the standard frequency supplied from a temperature control crystal oscillator 44 into a standard frequency divider 45. The standard frequency signal, after being frequency divided by the standard frequency divider 45, is put into the channel PLL 43 as a standard frequency divided signal.

Then, the channel PLL 43 compares the phase difference between the output frequency divided signal and the standard frequency divided signal, and then outputs the phase difference to a loop filter 46. The loop filter 46 converts the input phase difference component to the DC voltage by integrating the input phase difference component, and applies it onto the control terminal of the voltage controlled oscillator 41.

With this arrangement, the channel PLL unit 40 transmits the frequency signal of the voltage controlled oscillator 41 to a frequency mixer 51 of a mixer unit 50 under the condition where the frequency of the output frequency divided signal is converged toward the frequency of the standard frequency divided signal.

On the other hand, in the GSM mode, a fixed PLL unit 60 outputs the frequency signal of a predetermined oscillation frequency in a voltage controlled oscillator for GSM 61 and feeds it into an output frequency divider 62. The frequency signal, after being frequency divided at the output frequency divider 62, is put into the fixed PLL 63 as an output frequency divided signal.

Furthermore, the fixed PLL unit 60 captures the standard frequency signal of the standard frequency supplied from the temperature control crystal oscillator 44 into the standard frequency divider 64. The standard frequency signal, after being frequency divided at the standard frequency divider 64, is put into the fixed PLL 63 as a standard frequency divided signal.

Then, the fixed PLL 63 compares the phase difference between the output frequency divided signal and the standard frequency divided signal, and outputs the phase difference to the loop filter 65. The loop filter 65, after converting the input phase difference component to the DC voltage by integrating the input phase difference component, and applies it to the control terminal of the voltage controlled oscillator 61.

Thus, the fixed PLL unit 60 transmits the frequency signal of the voltage controlled oscillator 61 to the frequency mixer 51 under the condition in which the frequencies of the output frequency divided signal and the standard frequency divided signal converge to the equal level.

The frequency mixer 51 generates the frequencies of the sum and difference of these two frequencies by mixing these two frequency signals and puts these into a band-pass filter 52.

Here, the frequency formed by the difference of those two frequencies is the local oscillation frequency that is equal to the received signal frequency, and the frequency formed by the sum of the two frequencies is an image frequency that is unnecessary for the demodulation.

Accordingly, the cut-off frequency of the band-pass filter 52 is properly selected, and the band-pass filter 52 selectively passes only the lower local oscillation frequency out of the two frequencies (the local oscillation frequency and the image frequency) and puts it into the polyphase filter 33 of the demodulator 14.

At this point, the mixer unit 50 generates the local oscillation frequency right in front of the input terminal of the polyphase filter 33. Accordingly, the signal receiving processing circuit 1 remarkably shortens the transmission line of the local oscillation frequency and greatly decreases DC offset from the quadrature baseband signal.

In this connection, the band-pass filter 52 eliminates the image frequency as described above. Therefore, the quadrature demodulator 14 demodulates the received RF signal having the received signal frequency equal to the image frequency, and thus prevents the original received RF signal (i.e., the received RF signal having the received signal frequency equal to the local oscillation frequency) from being difficult to be demodulated.

Furthermore, the channel PLL unit 40 feeds, in the DCS mode, frequency signals of the prescribed oscillation frequencies generated at the channel PLL 43 and the voltage controlled oscillator for GSM 47 are fed into the frequency mixer 53 as in the same manner as in the GSM mode.

At this point, the fixed PLL unit 60 feeds the frequency signal of the prescribed oscillation frequency generated at the fixed PLL 63 and the voltage controlled oscillator for DCS 66 into the frequency mixer 53 in the same manner as in the GSM mode.

Thus, the frequency mixer 53 generates two frequencies, the sum of the two frequencies and the difference of the two frequencies by mixing the two frequencies. And then, the band-pass filter 54 selectively passes the frequency having the lower frequency out of the two frequencies (local oscillation frequency equal to the received signal frequency) and feeds it into the polyphase filter 23 in the same manner as in the GSM mode.

Furthermore, in the UMTS mode, it feeds the frequency signal having the prescribed oscillation frequency generated at the channel PLL 43 and the voltage controlled oscillator for UMTS 48 into the frequency mixer 55 in the same manner as in the GSM mode.

At this point, the fixed PLL unit 60 puts the frequency signals having the prescribed oscillation frequencies generated at the fixed PLL 63 and the voltage controlled oscillator for UMTS 67 into the frequency mixer 55 in the same manner as in the GSM mode.

Thus, the frequency mixer 55, by mixing these two frequencies, generates two frequencies, the sum and the difference of the two frequencies. Then, the band-pass filter 56 selectively passes only the frequency having the lower frequency (local oscillation frequency equal to the received signal frequency) out of these two frequencies by the band-pass filter 56 being provided near to the demodulator 34, and feeds it into the polyphase filter 33.

Thus, the signal receiving processing circuit 1 can greatly decrease the DC offset from the received baseband signals in the GSM mode, the DCS mode, and the UMTS mode respectively.

By the way, in the signal receiving processing circuit 1 thus configured, as it is apparent from FIG. 5, voltage controlled oscillators for GSM, DCS and UMTS respectively, 41, 47, 48 and 61, 66, 67 are needed in the channel PLL unit 40 and the fixed PLL unit 60.

Furthermore, it is necessary to have frequency mixers for GSM, DCS and UMTS, 51, 53, 55 and band-pass filters for GSM, DCS and UMTS 52, 54, 56 in the mixer unit 50. Thus, it is obvious that the circuit scale of the signal receiving and processing circuit 1 becomes larger due to such configuration.

Furthermore, since this signal receiving processing circuit 1 can only be formed by the band-pass filters 52, 54 and 56 which are formed of discrete components, which are difficult to be integrated onto the IC, the circuit scale further increases. As a result, although DCR is applied in the signal receiving processing circuit 1, there is a problem still unsolved for making the circuit scale smaller.

Therefore, as shown in FIG. 6, where corresponding parts of FIG. 5 are given the same reference numerals, it is considered that an image removal mixer that can be formed by integrating in an IC chip is provided in place of said mixer unit 50 (FIG. 5) in the frequency generating unit 71 of the signal receiving processing circuit 70.

In this case, the image removal mixer is a circuit capable of taking out only such as the difference frequency out of the sum and difference frequencies when the two frequencies are mixed.

More specifically, in the GSM mode, this circuit feeds the frequency signal generated at the channel PLL 40 and the voltage controlled oscillator for GSM 41 into the polyphase filter 73 of the image removal mixer 72. Said frequency signal is split into two signals in quadrature in the polyphase filter 73 and fed into one side input terminals of the frequency mixers 74 and 75 respectively.

At this point, the frequency signal generated at the fixed PLL 63 and the voltage controlled oscillator for GSM 61 is fed into the frequency divider 76 of the image removal mixer for GSM 72. And after being frequency divided in half at the frequency divider 76, the frequency signal is converted to two signals in quadrature and these two signals are fed into the other side input terminals of the frequency mixers 74 and 75.

At this point, when the phase relation of the four signals to be put into the frequency mixers 74 and 75 is properly selected, the image frequency is removed by adding output signals of these frequency mixers 74 and 75 at the adder 77 of the later stage and only the local oscillation frequency equal to the received signal frequency can be obtained.

Then, the local oscillation signal having the local oscillation frequency is fed into the polyphase filter 13 from the adder 77. Thus, in the GSM mode, the received RF signals are quadrature demodulated directly in the quadrature demodulator for GSM 14.

Furthermore, in the DCS mode, the frequency signal generated at the channel PLL 40 and the voltage controlled oscillator for DCS 47 is divided into two signals in quadrature at the polyphase filter 81 in the image removal mixer for DCS 80, and these are fed respectively into frequency mixers 82 and 83.

At this point, the frequency signal generated at the fixed PLL 63 and the voltage controlled oscillator for DCS 66 is frequency divided in half via the frequency divider 84, and converted to two signals in quadrature and these signals are fed respectively into the frequency mixers 82 and 83.

At this point, the phase relation of the four signals to be put into the frequency mixers 82 and 83 is selected properly in advance, and the output signals of these frequency mixers 82 and 83 are added at the adder 85. As a result, only the local oscillation frequencies equal to the received signal frequency are generated and fed into the polyphase filter 23.

Furthermore, in the UMTS mode, the frequency signal generated at the channel PLL 40 and the voltage controlled oscillator for UMTS 48 is divided into two signals in quadrature by the polyphase filter 91 in the image removal mixer for UMTS 90 in the same manner as in the GSM mode and in the DCS mode, and these are fed respectively into the frequency mixers 92 and 93.

At this time the frequency signal generated at the fixed PLL 63 and the voltage controlled oscillator for DCS 67 is frequency divided in half via the frequency divider 94, and converted to two signals in quadrature and these are fed into frequency mixers 92 and 93 respectively.

At this point, the phase relation of the four signals to be put into frequency mixers 92 and 93 is properly selected, and the output signals of these frequency mixers 92 and 93 are added by the adder 95. As a result, only the local oscillation frequencies equal to the received signal frequency are generated, and these are fed into the polyphase filter 33.

With this arrangement, the signal receiving processing circuit 70 can generate the desired local oscillation signal not using the band-pass filter that is difficult to be integrated in an IC chip.

However, as is clear from FIG. 6, since the image removal mixers for GSM, DCS and UMTS, 72, 80 and 90 are provided in the signal receiving processing circuit 70, the circuit scale in the IC increases. As a result, this signal receiving processing circuit 70 is still insufficient to simplify the circuit configuration.

DESCRIPTION OF THE INVENTION

The present invention has been made in considering the above problems and is proposing a wireless signal receiving device and a demodulation processing circuit that can demodulate the received signals having different received signal frequencies with a simple circuit configuration.

To solve such problems in the present invention, as well as fixed frequency signals of the fixed frequencies are generated by the fixed frequency signal generating means, standard frequency signals for receiving having the standard frequencies for receiving are generated by the standard frequency signal generating means corresponding respectively to multiple received signals having different received signal frequencies, and by sharing the local oscillation frequency generating means among each received signal, local oscillation signals having the local oscillation frequencies corresponding to each of the received signal frequencies are formed respectively from the fixed frequency signals and the standard frequency signals for receiving, and each demodulation means demodulates the received signals by using the corresponding local oscillation signals respectively.

Accordingly, since the local oscillation signal generating means is shared among each demodulation means, the circuit configuration can be simplified.

BEST MODE FOR CARRYING OUT THE INVENTION

With reference to the accompanying figures one embodiment of the present invention is described in more detail.

Figure 1:
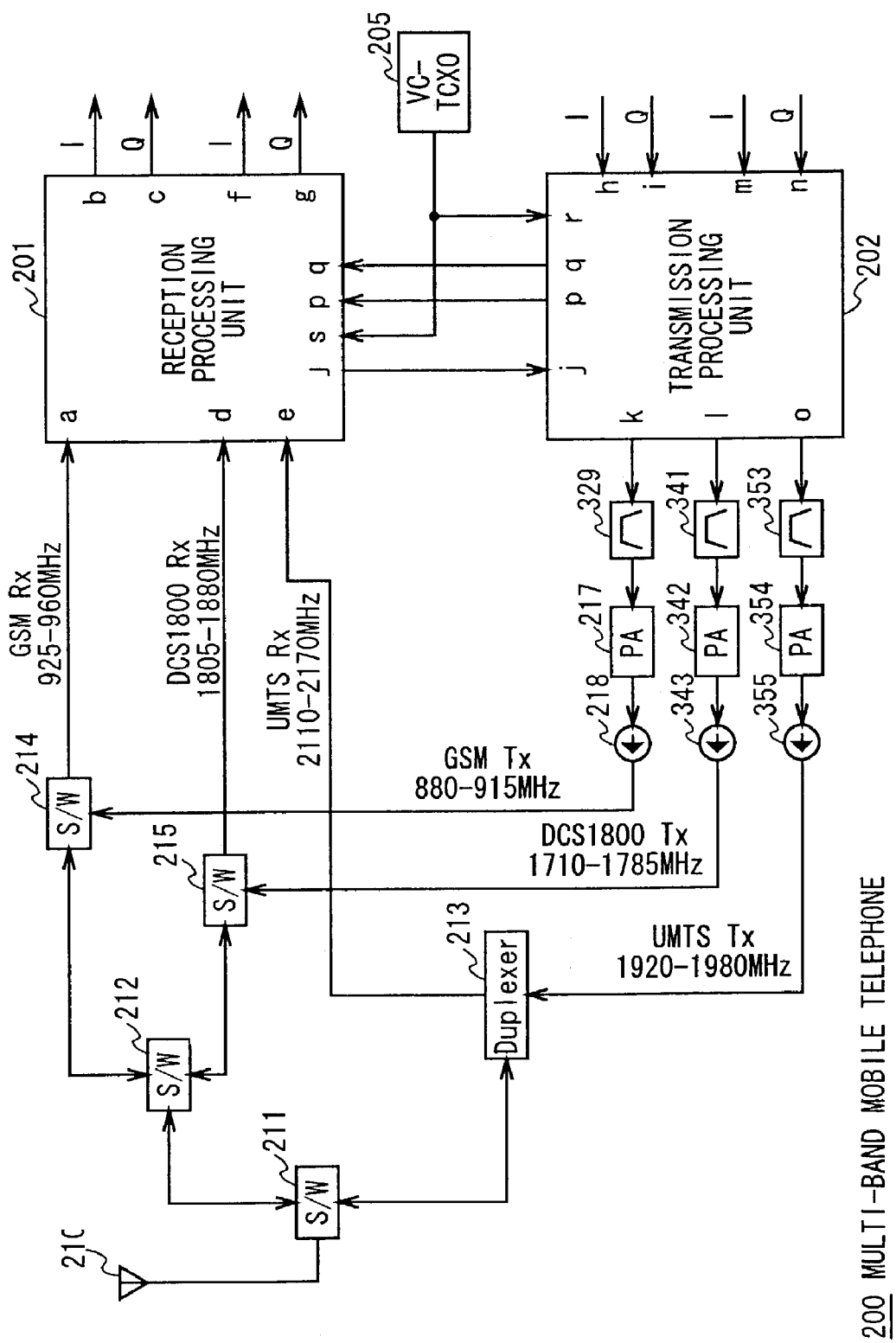
FIG. 1 is a block diagram showing an embodiment of the circuit configuration of multi-band mobile telephone equipment of the present invention.

In FIG. 1, the reference numeral 200, as a whole, shows mobile telephone equipment to which the DCR system is applied and capable of jointly using GSM, DCS and UMTS as wireless communication systems (hereinafter this is referred as multi-band mobile telephone).

This multi-band mobile telephone is operated in three modes, the GSM mode, the DCS mode, and the UMTS mode, corresponding to the wireless communication system to be used. Therefore, this multi-band mobile telephone 200 can be used as a multi-band system terminal compatible to both services of TDMA and W-CDMA.

In this multi-band mobile telephone 200, the received RF signal received by an antenna 210 is transmitted to a signal receiving processing unit 201 through a signal channel comprised of a high frequency switch (S/W) and a band-pass filter switched corresponding to the GSM mode, the DCS mode, and the UMTS mode. In this connection, the detailed configuration and the concrete operation of the signal receiving processing unit 201 are described later.

In the later stage of the signal receiving processing unit 201, received-signal baseband processing units (not shown in Figures) corresponding respectively to the GSM, DCS, and UMTS are provided.

These received-signal baseband processing units apply a prescribed digital baseband processing to the quadrature baseband signals (I, Q signals) generated from the received RF signal at the signal receiving processing unit 201. More specifically, the received-signal baseband processing units comprise such as A/D converters for analog/digital (D/A) converting I, Q signals, and generate I/Q digital data having a fixed bit rate.

On the other hand, signal transmission baseband processing units (not shown in Figures) corresponding respectively to GSM, DCS, and UMTS are provided in the signal transmission system similarly to the signal receiving system. And IQ digital data having the fixed data rate arranged at the digital signal processing device (DSP, not shown in Figures) is put into these signal transmission baseband processing units.

These IQ digital data, after being digital/analog (D/A) converted at the signal transmission baseband processing units, is put into a signal transmission processing unit 202 as signal transmission baseband signals (I, Q signals). In this connection more detailed configuration and the concrete operation of the signal transmission processing unit 202 are discussed later referring to the attached drawings.

In the signal transmission processing unit 202, aftermentioned signals to which the quadrature modulation or the frequency conversion is applied are power amplified by a power amplifier (PA) so that these signals have the necessary transmission powers. Then, these are radiated from an antenna 211 through the high frequency switch and bandpass filters switched corresponding to the GSM mode, the DCS mode and the UMTS mode.

In this connection, a VC-TCXO 205 is a variable frequency temperature control crystal oscillator, and here produces the standard frequency (13.00 [MHz]) necessary for the signal transmission processing to be described later.

Figure 2:
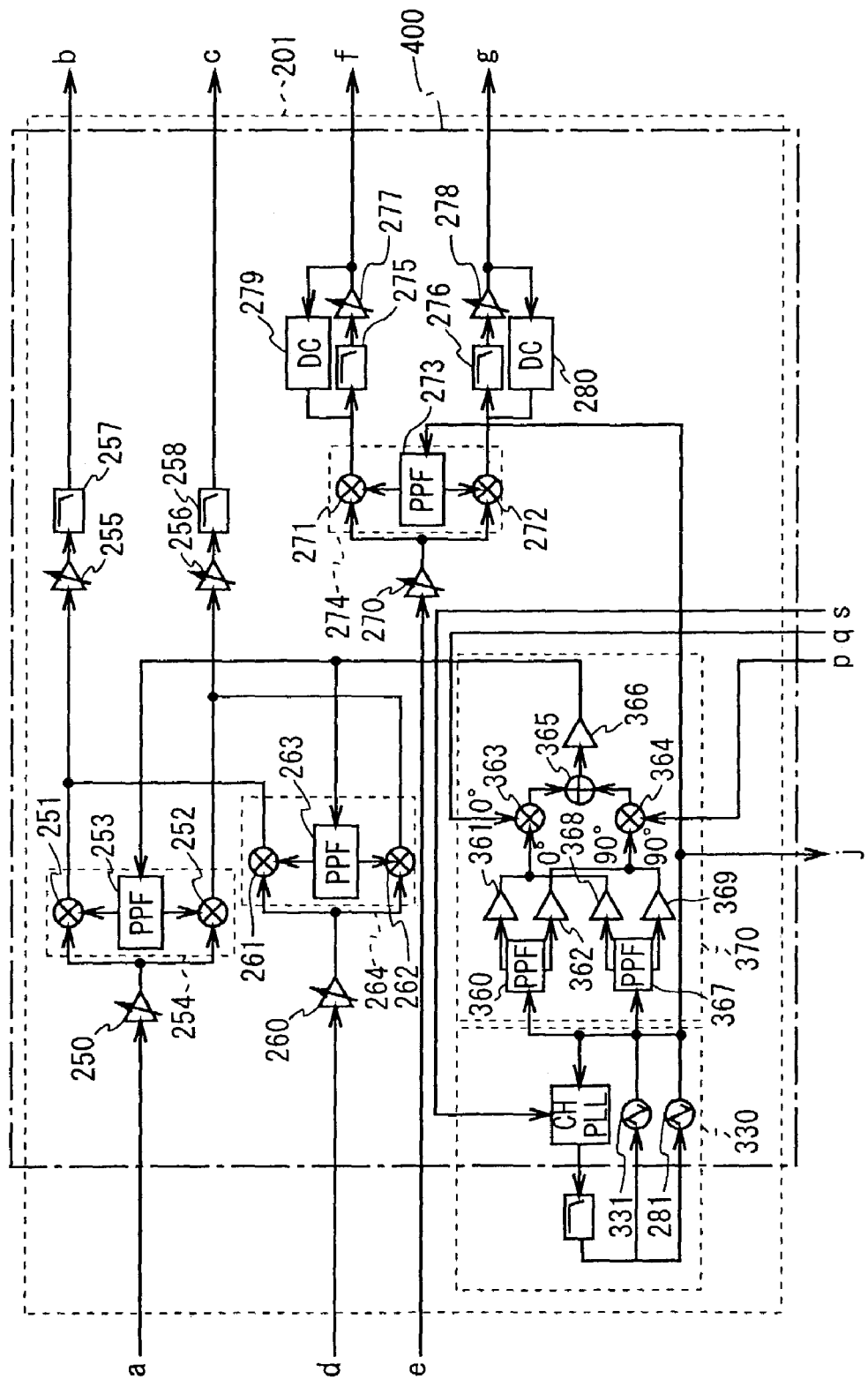
FIG. 2 is a block diagram showing the circuit configuration of a signal receiving processing unit.

At this point, the general flow of signals in the signal receiving system of the multi-band mobile telephone 200 is described more in detail referring to FIGS. 1 and 2. FIG. 2 shows the detailed circuit configuration of the signal receiving processing unit 201 of FIG. 1, and terminal marks a, b, c . . . in the Figure mean the connection points to input and output stages and the signal transmission processing unit 202 for said signal receiving processing unit 201.

The received RF signal is put into a high frequency switch (S/W) 211 via the antenna 210 shown in FIG. 1. At this point, the high frequency switch 211 switches the channel of the signal according to the wireless communication system mode in which the multi-band mobile telephone 200 is in the GSM mode, in the DCS mode, and in the UMTS mode.

When the multi-band mobile telephone 200 is in the GSM mode or the DCS mode, the received RF signal is fed into a high frequency switch 212, and when the multi-band mobile telephone 200 is placed in the UMTS mode, the received RF signal is fed into the duplexer 213. Then, the received RF signals in the GSM mode and in the CDS mode are divided further into the GSM path and the DCS path by the high frequency switch 212.

More specifically, in the GSM mode, the received RF signal is fed into the high frequency switch 214 and, in the DCS mode, is fed into a high frequency switch 215. Moreover, these paths of the high frequency switches 214 and 215 are to be switched depending on the signal transmission/reception.

Now, the case of GSM mode is explained in the following paragraphs. In the GSM mode, the received RF signal is fed into a variable gain low-noise amplifier 250 of FIG. 2 during the signal reception slot.

Furthermore, during the signal transmission slot, outputs of a power amplifier 217 of FIG. 1 are fed into the high frequency switch 214 via an isolator 218 in the opposite direction to the signal reception slot.

The received RF signal, after being amplified by the variable gain low-noise amplifier 250, is put into a quadrature demodulator 254 comprised of frequency mixers 251 and 252 and a polyphase filter 253, then is multiplied by the local oscillation frequency.

This variable gain low-noise amplifier 250 conducts the processing such as controlling a necessary band and the automatic gain control so that the received RF signal becomes the proper level. Moreover, the polyphase filter 252 has the function to generate local oscillation signals in quadrature.

Here, the direct conversion is realized by setting the local oscillation frequency being equal to the received signal frequency of the received RF signal. Accordingly, I/Q quadrature baseband (BB) signals are obtained in outputs of the frequency mixers 251 and 252.

This quadrature baseband signals are handed over to the GSM and DCS received-signal baseband processing units after such interference signals in the band other than the frequency in use such as a neighboring channel is removed via the variable gain amplifiers 255, 256 and low-band-pass filters 257 and 258.

In this connection, the variable gain low-noise amplifier 250, and the variable gain amplifiers 255 and 256 are so controlled that the signal amplitude of the A/D converter inputs are kept constant for the digital processing in the received-signal baseband processing units, and thus, the input dynamic range of the A/D converter can be kept in a constant state.

Furthermore, as to the DCS signal path, the processing similar to those of GSM described above is conducted. More specifically, in the DCS mode, the received RF signal is amplified at a variable gain low-noise amplifier 260. The amplified signal is put into a quadrature demodulator 264 comprised of frequency mixers 261 and 262 and a polyphase filter 263.

Then, in the quadrature demodulator 264, the quadrature baseband signal obtained upon being multiplied by the local oscillation frequency is transmitted to the GSM and DCS received-signal baseband processing units via the variable gain amplifiers 255 and 256 and the low-band-pass filters 257 and 257 in the same manner as in the GSM mode described above.

On the other hand, in the UMTS mode, the received RF signal is separated from the transmission signal at the duplexer 213 and is fed into a variable gain low-noise amplifier 270 of FIG. 2. At the same time, the continuous transmission signals are fed toward the high frequency switch 211 via the duplexer 213.

Here, the reason for not using the high frequency switch as in the case of the GSM/DCS paths described above in the UMTS path is that W-CDMA is a continuous signal transmission/reception system, and it is essential to have such configuration due to its system quality.

In the UMTS mode, the received RF signal is amplified by the variable gain low-noise amplifier 270 in the same manner as in the GSM mode and the DCS mode, and is fed into the quadrature demodulator 274 comprised of frequency mixers 271 and 272 and a polyphase filter 273.

As a result, in outputs of the frequency mixers 271 and 272, I/Q signals of the quadrature baseband (BB) signals can be obtained.

These I/Q signals are put into variable gain amplifiers 277 and 278 via low-band-pass filters 275 and 276 and controlled to be in the fixed amplitude. Then, the amplitude-controlled signal is handed over to the A/D converter in the UMTS received-signal baseband processing unit of the later stage.

Here, the UMTS mode is different from the cases of the GSM mode and the DCS mode, wherein the DC feedback is applied from outputs of the circuit comprised of the low-band-pass filters 275 and 276 and the variable gain amplifiers 277 and 278 by the DC amplifiers 279 and 280.

Since the received RF signal of W-CDMA (UMTS) has 2 [MHz] band, which is sufficiently wide as compared to the band (200 ([MHz]) of the received RD signal of GSM and DCS, the information contained in the signal is not lost much even when the low-band frequency is removed by the DC feedback.

Usually, the low-band cut-off frequency is approximately 2 [MHz]. However, when 2 [MHz] low-band frequency is dropped in GSM and DCS, normally receiving signals cannot be realized.

This means that in the W-CDMA (UMTS) system, the DC offset cancel can be realized by using comparatively simple circuit such as shown in FIG. 2, which, however, is difficult in the cases of GSM and DCS.

Accordingly, in the UMTS mode, a voltage controlled oscillator 281 can be oscillated using the oscillation frequency equal to the received signal frequency of the received RF signal without using the offset frequency for decreasing the DC offset.

Figure 3:
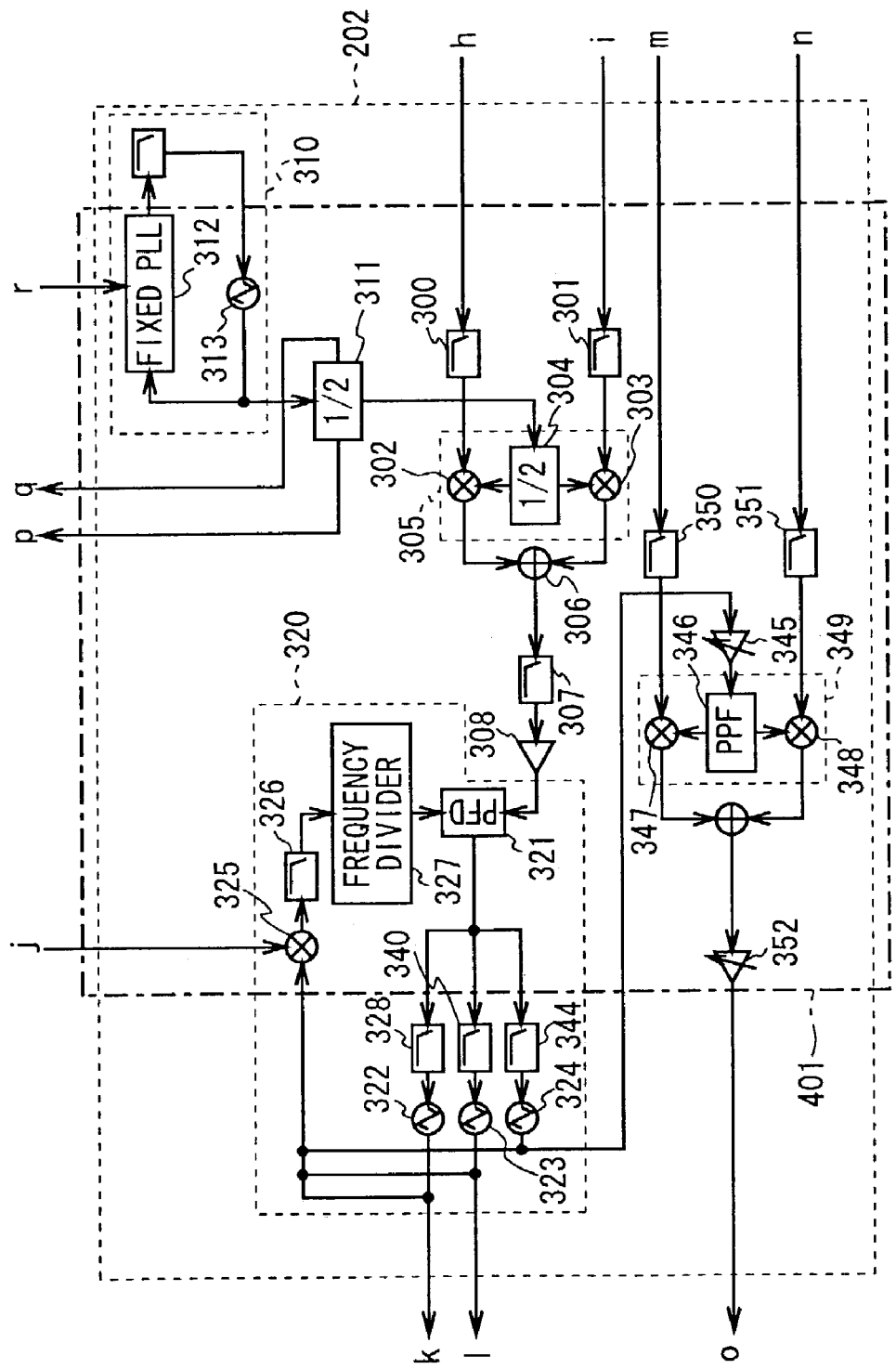
FIG. 3 is a block diagram showing the circuit configuration of a signal transmission processing unit.
Figure 4:
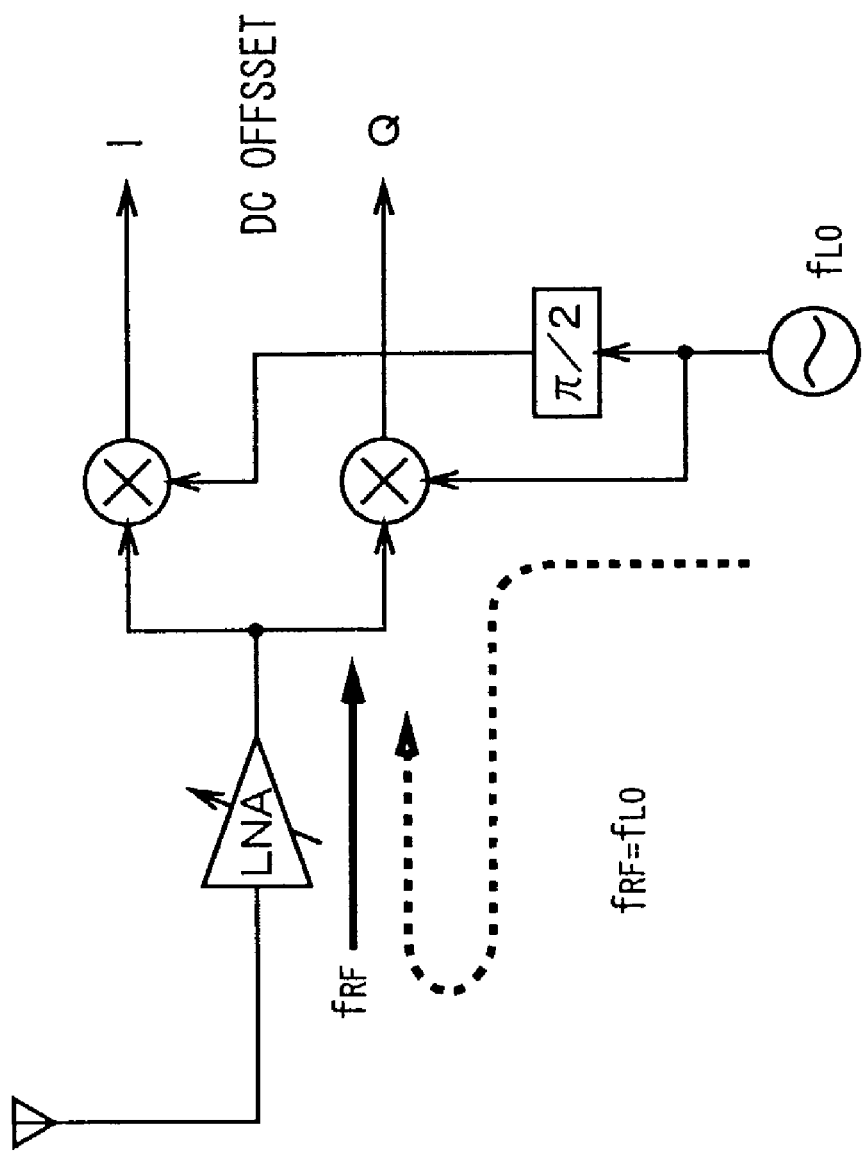
FIG. 4 is a block diagram illustrating the DC offset component overlapping onto I signal and Q signal.
Figure 5:
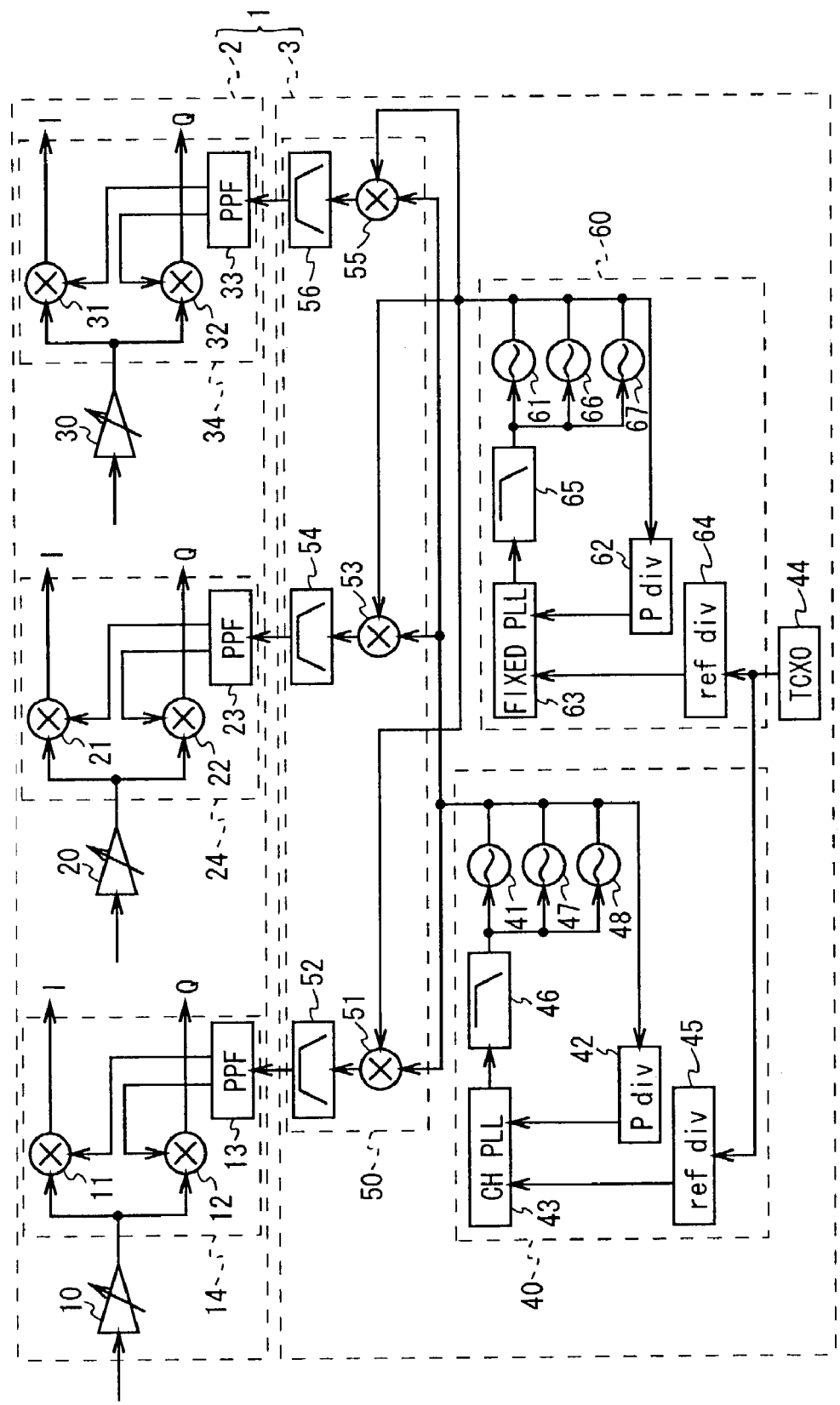
FIG. 5 is a block diagram showing the circuit configuration of a receiving processing circuit applying a direct conversion system.
Figure 6:
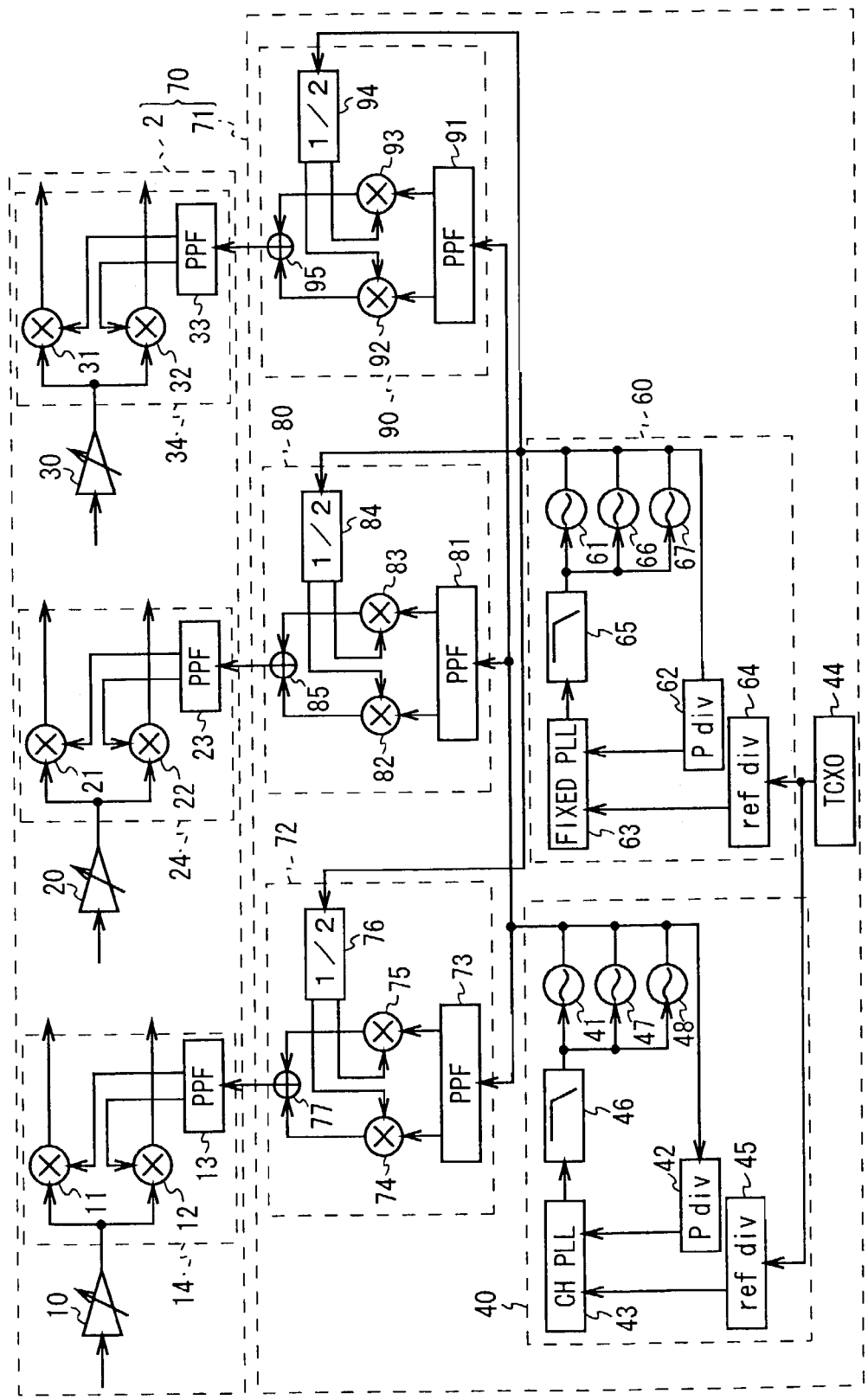
FIG. 6 is a block diagram showing the circuit configuration of a signal receiving processing circuit using an image removal mixer.

Next, the signal transmission system of the multi-band mobile telephone 200 is explained along the flow of that signal. FIG. 3 shows the detailed configuration of the signal transmission processing unit 202 described above in FIG. 1, and terminal marks h, i, j, . . . in the Figure mean input/output stages to said signal transmission processing unit 202 and connection ends with the signal receiving processing unit 201.

When the multi-band mobile telephone 200 is in the GSM mode and the DCS mode, I/Q signals are transmitted from the signal transmission baseband processing unit to the signal transmission processing unit 202.

More specifically, the I/Q signals are fed into a quadrature modulator 305 comprised of frequency mixers 302, 303 and a frequency divider 304 via low-band-pass filters 300 and 301 shown in FIG. 3.

Here, the fixed frequency signal generated at a fixed PLL unit 310 to generate the fixed frequency of 760 [MHz] is frequency divided at a frequency divider 311, and this divided signal is fed into the frequency divider 304. Accordingly, two signals having 190 [MHz] frequencies in quadrature can be obtained in the output of the frequency divider 304.

As a result, 190 [MHz] IF signal quadrature modulated by the baseband (BB) signal can be obtained in the outputs of the quadrature modulator 305. This IF signal is put into a phase comparator (PFD) 321 of the offset PLL 320 via the low-band-pass filter 307 and the high frequency amplifier 308 in sequence.

In the GSM mode, in the offset PLL 320 a voltage controlled oscillator for GSM 322 is in operation and the other voltage controlled oscillators 323 and 324 are suspended.

Here, in the frequency mixer 325, the output from the voltage controlled oscillator for GSM 322 is multiplied by the signal from the voltage controlled oscillator for GSM 331 in the channel PLL unit 330 shown in FIG. 2.

Then, in the GSM mode, when the channel PLL unit 330 is controlled so that the oscillation frequency $f_{CH\_TX\_GSM}$ becomes the value shown by Formula (1)

$$f_{CH\_TX\_GSM} = 1260 \sim 1295 \text{ [MHz]} \tag{1}$$

the frequencies of the sum and the difference of the oscillation frequency $f_{CH\_TX\_GSM}$ of the voltage controlled oscillator 331 for said channel PLL and the oscillation frequency $f_{CH\_GSM}$ of the voltage controlled oscillator for GSM 322 can be obtained in the output of the frequency mixer 325.

More specifically, $$f_{CH\_TX\_GSM} \pm f_{TX\_GSM} \tag{2}$$

the signal having the frequency expressed by the above Formula (2) is fed into the low-band-pass filter 326.

Then, when the cut-off frequency of the low-band-pass filter 326 is properly selected, the higher frequency is removed out of the two frequencies, $$f_{CH\_TX\_GSM} - f_{TX\_GSM} \tag{3}$$

and only the lower frequency expressed by the above Formula is fed into a frequency divider 327.

In the frequency divider 327, the signal having the lower frequency is frequency divided in half and put into the phase comparator 321. Accordingly, by comparing the frequencies of the signal frequency divided in half and the above described 190 [MHz] frequency of the IF signal, the phase comparator 321 outputs the phase difference of these frequencies to the loop filter 328.

A loop filter 328 integrates and converts the phase difference components to the DC voltage, and applies them to the control terminal of the voltage controlled oscillator for GSM 322.

Thus formed loop converges so that the two frequencies of input signals of the phase comparator 321 become the same.

$$(f_{CH\_TX\_GSM} - f_{TX\_GSM})/2 = 190 \text{ [MHz]} \tag{4}$$

As a result, the above Formula holds.

Then, substituting Formula (1) into Formula (4) results in that the oscillation frequency $f_{TX\_GSM}$ of the voltage controlled oscillator for GSM 322 becomes the value expressed by, $$f_{TX\_GSM} = f_{CH\_TX\_GSM} - 380 \text{ [MHz]} = 880 \sim 915 \text{ [MHz]} \tag{5}$$

and this becomes equal to the GSM signal transmission frequency.

In this connection, the constant of the loop filter 328 should have a cut-off frequency sufficiently higher than the demodulation rate so that the GMSK (Gaussian filtered Minimum Shift Keying) modulation used in the GSM can be applied.

Thus, the signal from the voltage controlled oscillator for GSM 322 is transmitted to the power amplifier 217 via the band-pass filter 329 (FIG. 1). Then, the output from the power amplifier 217 is fed into the high frequency switch 214 through the isolator 218.

Furthermore, in the DCS mode, the voltage controlled oscillator for DCS 323 is in operation and the other voltage controlled oscillators 322 and 324 are suspended.

Then, in the frequency mixer 325, the output from the voltage controlled oscillator for DCS 323 is multiplied by the signal from the voltage controlled oscillator 281 in the channel PLL unit 330 shown in FIG. 2.

Then, in the DCS mode, when the channel PLL unit 330 is controlled so that the oscillation frequency $f_{CH\_TX\_DCS}$ of the voltage controlled oscillator 281 becomes the value to be expressed by $$f_{CH\_TX\_DCS} = 2090 \sim 2165 \text{ [MHz]} \tag{6}$$

the frequencies of the sum and the difference of the oscillation frequency $f_{CH\_TX\_DCS}$ of the voltage controlled oscillator 281 and the oscillation frequency $f_{TX\_DCS}$ of the voltage controlled oscillator for DCS 323 are obtained in the output of the frequency mixer 325.

Then, the signal having the frequency expressed by the following Formula, $$f_{CH\_TX\_DCS} \pm f_{TX\_DCS} \tag{7}$$

is fed into the low-band-pass filter 326.

Then, when the cut-off frequency of the low-band-pass filter 326 is selected properly, the higher frequency out of the two frequencies is removed.

$$f_{CH\_TX\_DCS} - f_{TX\_DCS} \tag{8}$$

Then, only the signal having the lower frequency expressed by the above Formula (8) is put into the frequency divider 327.

Then, at the frequency divider 327, the signal having the lower frequency is frequency divided in half, and put into the phase comparator 321.

Accordingly, by comparing the frequencies of the signal frequency divided in half with the frequency of 190 [MHz] of said IF signal, the phase comparator 321 outputs the phase difference of these frequencies to the loop filter 340.

The loop filter 340 integrates and converts the phase difference component to the DC voltage, and applies this to the control terminal of the voltage controlled oscillator for DCS 323.

The loop thus formed is converged so that the two input signal frequencies of the phase comparator 321 become equal.

$$(f_{CH\_TX\_DCS} - f_{TX\_DCS})/2 = 190 \text{ [MHz]} \tag{9}$$

As a result, it results as the above Formula.

At this point, substituting Formula (6) into Formula (9) results in that the oscillation frequency $f_{TX\_DCS}$ of the voltage controlled oscillator for DCS 323 becomes the value as expressed by the following Formula (10)

$$\begin{aligned} f_{TX\_DCS} &= f_{CH\_TX\_DCS} - 380 \text{ [MHz]} \\ &= 1710 \sim 1785 \text{ [MHz]} \end{aligned} \tag{10}$$

Then, it becomes equal to the DCS signal transmission frequency.

In this connection, the constant of the loop filter 340 is required to have a high cut-off frequency sufficiently higher than the modulation rate so that the GMSK modulation used in DCS can be applied.

Thus, the signal from the voltage controlled oscillator for DCS 323 is transmitted to the power amplifier 342 via the band-pass filter 341 (FIG. 1). Then, the output from the power amplifier 342 is fed into the high frequency switch 215 through the isolator 343.

On the other hand, the same operation as that of the case of in the GSM mode and the DCS mode described above can be applied to the case of in the UMTS mode. In the UMTS mode, since the frequency to be generated at the channel PLL unit 330 holds a fairly good approximation to that of the DCS, the same voltage controlled oscillator 281 can be used. The operation in the UMTS mode is explained as follows.

In the UMTS mode, the quadrature modulator 305 comprised of the frequency mixers 302 and 303 and the frequency divider 304 is not used as a modulator. For example, by cutting off the power source of the frequency mixer 303 and adding Vbias and 0 [V] into differential inputs of I channel respectively, the frequency mixer 302 functions as the cascade connected amplifier.

Thus, the signal generated at the fixed PLL unit 310 is frequency divided into four through the frequency divider 311, and fed into the phase comparator 321 through the frequency mixer 302, the adder 306, the low-band-pass filter 307, and the high frequency amplifier 308 in sequence as the 190 [MHz] signal. This 190 [MHz] signal is a non-modulated signal, which is different from the cases of the GSM mode and the DCS mode.

In the UMTS mode, the voltage controlled oscillator for UMTS 324 operates in the offset PLL 320, and the other voltage controlled oscillators 322 and 323 are suspended.

Accordingly, an output from the voltage controlled oscillator for UMTS 324 is, in the frequency mixer 325, multiplied by the signal from the voltage controlled oscillator 281 in the channel PLL unit 330 shown in FIG. 2.

At this point, when the oscillation frequency $f_{CH\_TX\_UMTS}$ of the voltage controlled oscillator 281 is controlled to be the value expressed by the following Formula (11), $$f_{CH\_TX\_UMTS} = 2110 \sim 2170 \text{ [MHz]} \quad (11)$$

in the output of the frequency mixer 325, frequencies of the sum and difference of the oscillation frequency $f_{CH\_TX\_UMTS}$ of the voltage controlled oscillator 281 and the oscillation frequency $f_{TX\_UMTS}$ of the voltage controlled oscillator for UMTS 324 can be obtained.

More specifically, the signal having the frequency expressed by the following Formula (12)

$$f_{CH\_TX\_UMTS} \pm f_{TX\_UMTS} \quad (12)$$

is fed into the low-band-pass filter 326.

At this point, when the cut-off frequency of the low-band-pass filter 326 is properly selected, the higher frequency is removed from these two frequencies.

$$f_{CH\_TX\_UMTS} - f_{TX\_UMTS} \quad (13)$$

And only the signal having the lower frequency expressed by the above Formula (13) can be obtained.

Here, in the UMTS mode, the signal having the lower frequency is fed into the frequency divider 327, but passes through said frequency divider 327, and is put into the phase comparator 321.

The phase comparator 321, by comparing the lower frequency with the frequency (190 [MHz]) of the non-demodulated signal described above, outputs the phase difference between these frequencies to the loop filter 344.

The loop filter 344 integrates and converts the phase difference component to the DC voltage, and applies this to the control terminal of the voltage controlled oscillator for UMTS 324.

Thus formed loop is converged so that the two frequencies of the input signals of the phase comparator 321 become equal.

$$f_{CH\_TX\_UMTS} - f_{TX\_UMTS} = 190 \text{ [MHz]} \quad (14)$$

As a result, the above Formula (14) holds.

At this point, substituting Formula (11) into Formula (14) results in that the oscillation frequency $f_{TX\_UMTS}$ of the voltage controlled oscillator for UMTS 324 becomes the value shown by $$f_{TX\_UMTS} = f_{CH\_TX\_UMTS} - 190 \text{ [MHz]} \quad (15)$$
$$= 1920 \sim 1980 \text{ [MHz]}$$

Then, this value becomes equal to the UMTS signal transmission frequency.

Under this condition, output signal from the voltage controlled oscillator for UMTS 324 is put into the polyphase filter 346 via the variable gain amplifier 345.

The polyphase filter 346 forms a quadrature modulator for UMTS 349 with frequency mixers 347 and 348. Therefore, the I/Q signals reached to the frequency mixers 347 and 348 from the signal transmission baseband processing unit via the low-band-pass filters 350 and 351 are mixed with signals in quadrature to be put out from the polyphase filter 346 in said frequency mixers 347 and 347.

The signal thus quadrature modulated is sent out to the power amplifier 354 successively through the variable gain amplifier 352 and the band-pass filter 353 (FIG. 1). And the output from the power amplifier 354 is fed into the duplexer 213 through the isolator 355.

Next, the formation of the local oscillation frequency for receiving is explained. Firstly, in UMTS (i.e., W-CDMA), as described above, the DC offset compensation circuit can be realized in an analog circuit. As a result, when the local oscillation signal leaks to the input side of the variable gain low-noise amplifier 270, such as a transmission line connected with the duplexer 213, the DC offset can be removed at the compensation circuit comprised of the DC amplifiers 279 and 280.

Therefore, in the channel PLL unit 330, it is not necessary to set the oscillation frequency of the voltage controlled oscillator 281 as the frequency different from the received signal frequency of the received RF signal.

Thus, in the UMTS mode, in the channel PLL unit 330, the oscillation frequency of the voltage controlled oscillator 281 is equal to the received signal frequency of the UMTS band as shown in Formula (11).

On the other hand, in the GSM mode, since it is necessary to minimize the DC offset, the oscillation frequency of the voltage controlled oscillator 331 is required to be oscillated with the frequency different from the received signal frequency in the channel PLL unit 330 of FIG. 2.

Then, the oscillation frequency $f_{CH\_RX\_GSM}$ of the voltage controlled oscillator 331 in the signal reception slot becomes the value expressed by the following Formula (16), $$f_{CH\_RX\_GSM} = 1305 \sim 1340 \text{ [MHz]} \quad (16)$$

by the control of the channel PLL unit 330.

Under this condition, the output signal of the voltage controlled oscillator 331 is separated into two signals in quadrature in the polyphase filter 360. Then, these signals are fed into one side of input terminals of frequency mixers 363 and 364 via buffered amplifiers 361 and 362 respectively.

At this point, the signal having the fixed frequency (760 [MHz]) generated at the fixed PLL 312 and the voltage controlled oscillator 313 in the fixed PLL unit 310 of FIG. 3 is fed into the frequency divider 311.

That signal of the fixed frequency, after being frequency divided in half at the frequency divider 311, is converted to signals of 380 [MHz] in quadrature, and these two signals are fed into the other side input terminals of the frequency mixers 363 and 364.

At this point, when the four signals to be put into the frequency mixers 363 and 364 have the phase relation as shown in FIG. 2, the signal expressed by the following Formula appears.

$$2 \cdot \sin \omega_{CH\_RX\_GSM} \cdot \sin \omega_{IF} = -\cos(\omega_{CH\_RX\_GSM} + \omega_{IF}) + \cos(\omega_{CH\_RX\_GSM} - \omega_{IF}) \quad (17)$$

And simultaneously, the signal expressed by the Formula (18)

$$2 \cdot \cos \omega_{CH\_RX\_GSM} \cdot \cos \omega_{IF} = \cos(\omega_{CH\_RX\_GSM} + \omega_{IF}) + \cos(\omega_{CH\_RX\_GSM} - \omega_{IF}) \quad (18)$$

appears in the output of the frequency mixer 364.

Then, adding the two output signals from the frequency mixers 363 and 364 at the adder 365 of the following stage results in that $$\cos(\omega_{CH\_RX\_GSM} - \omega_{IF}) \quad (19)$$

only the signal expressed by the above Formula (19) is put out.

More specifically, from the adder 365, as expressed by the Formula (20)

$$f_{CH\_RX\_GSM} - f_{IF} \quad (20)$$

the frequency having the frequency difference between the two output signals from the frequency mixers 363 and 364 can be obtained.

Here, $f_{IF}$ is the frequency of the signal sent out from the frequency divider 313 of the fixed PLL unit 310 and is 380 [MHz].

Then, substituting Formula (16) into Formula (20) results in that $$\begin{aligned} f_{CH\_RX\_GSM} - f_{IF} &\quad (21) \\ &= (1305 - 380) \sim (1340 - 380) \\ &= 925 \sim 960 \text{ [MHz]} \end{aligned}$$

Then, as expressed by the above Formula, the local oscillation frequency equal to the GSM received signal frequency can be obtained.

Then, the local oscillation signal of the local oscillation frequency is fed into the polyphase filter 253 via the high frequency amplifier 366. Thus, in the GSM mode, the received RF signal can be quadrature demodulated directly in the quadrature demodulator for GSM 254 comprised of said polyphase filter 253 and frequency mixers 251 and 252.

Furthermore, it is necessary to decrease the DC offset as much as possible in the DCS mode in the same manner as in the GSM mode.

Therefore, in the channel PLL unit 330 of FIG. 2, the voltage controlled oscillator 281 used for oscillation of the local oscillation frequency for UMTS should be oscillated with the frequency different from the DCS received signal frequency.

Then, the oscillation frequency $f_{CH\_RX\_DCS}$ of the voltage controlled oscillator 281 in the signal reception slot becomes the value expressed by:

$$f_{CH\_RX\_GSM} = 2185 \sim 2260 \text{ [MHz]} \quad (22)$$

by the control of the channel PLL unit 330.

Under such a condition, the output signal of the voltage control oscillator 281 is divided into the two signals in quadrature in the polyphase filter 367, and these signals are fed into one side of the input terminals of the frequency mixers 363 and 364 via the buffered amplifiers 368 and 369.

At this point, in the fixed PLL unit 310 of FIG. 3, the signal of the fixed frequency (760 [MHz]) generated at the fixed PLL 312 and the voltage controlled oscillator 313 is fed into the frequency divider 311.

Said signal of the fixed frequency, after being frequency divided in half at the frequency divider 311, is converted to two signals of 380 [MHz] in quadrature, and these two signals are fed into the other side of the input terminals of the frequency mixers 363 and 364.

At this point, when the four signals to be put into the frequency mixers 363 and 364 have the phase relation shown in FIG. 2 as in the case of the GSM mode, signal shown by the following Formula (23) appears in the output of said frequency mixer 363, $$2 \cdot \sin \omega_{CH\_RX\_DCS} \cdot \sin \omega_{IF} = -\cos(\omega_{CH\_RX\_DCS} + \omega_{IF}) + \cos(\omega_{CH\_RX\_DCS} - \omega_{IF}) \quad (23)$$

and simultaneously, the signal expressed by $$2 \cdot \cos \omega_{CH\_RX\_DCS} \cdot \cos \omega_{IF} = \cos(\omega_{CH\_RX\_DCS} + \omega_{IF}) + \cos(\omega_{CH\_RX\_DCS} - \omega_{IF}) \quad (24)$$

appears in the output of the frequency mixer 364.

Then, when output signals from the two frequency mixers 363 and 364 are added in the adder 365, $$\cos(\omega_{CH\_RX\_DCS} - \omega_{IF}) \quad (25)$$

only the signal expressed by the above Formula (25) is put out.

More specifically, from the adder 365, as shown by the Formula (26)

$$f_{CH\_RX\_DCS} - f_{IF} \quad (26)$$

the frequency formed of the difference between the frequencies of the two output signals from the frequency mixers 363 and 364 is obtained.

Thus, substituting Formula (22) into Formula (26) results in that $$\begin{aligned} f_{CH\_RX\_DCS} - f_{IF} &\quad (27) \\ &= (2185 - 380) \sim (2260 - 380) \\ &= 1805 \sim 1880 \text{ [MHz]} \end{aligned}$$

as expressed by the above Formula, in the DCS mode, the local oscillation frequency equal to the DCS received signal frequency can be obtained.

Then, the local oscillation signal of said local oscillation frequency is fed into the polyphase filter 263 via the high frequency amplifier 366. Thus, in the DCS mode, the received RF signal can be directly quadrature demodulated in the polyphase filter 263 and the quadrature demodulator for DCS 264 comprised of the frequency mixers 261, 262.

Here, the circuit comprised of the polyphase filters 360 and 367 and frequency mixers 363 and 364 can take out only one frequency (i.e., local oscillation frequency) out of the two frequencies (the local oscillation frequency and the image frequency) formed when these frequencies are mixed. Thus, this circuit is called as an image removal mixer 370.

And this image removal mixer 370 uses the fixed frequency generated at the fixed PLL unit 310 when the image removal mixer 370 generates both the GSM and DCS local oscillation frequencies. Accordingly, this image removal mixer 370 requires the separate polyphase filters for the GSM and the DCS 360 and 367, and shares the other circuit element in DCM and DCS.

According to this embodiment, in the multi-band mobile telephone 200, the image removal mixer 370 is shared for generating the local oscillation frequencies. Moreover, the channel PLL unit 330 and the fixed PLL unit 310 are shared for generating the local oscillation frequencies and the transmission signals.

Accordingly, in this multi-band mobile telephone 200, nearly the whole area of the signal receiving processing unit 201 indicated by a dotted line in FIG. 2 can be formed as one signal receiving system IC chip 400.

Furthermore, in this multi-band mobile telephone 200, nearly the whole area of the signal transmission processing unit 202 indicated by a dotted line in FIG. 3 can be formed as one signal transmission system IC chip 401.

According to the foregoing configuration, in this multi-band mobile telephone 200, in the GSM mode, the voltage controlled oscillator 331 of the channel PLL unit 330 oscillates the standard frequency for receiving. Moreover, the voltage controlled oscillator 313 of the fixed PLL unit 310 oscillates the fixed frequency.

Then, the image removal filter 370 placed in the vicinity of the quadrature demodulator for GSM 264 generates the local oscillation frequency equal to the received signal frequency for GSM from the standard frequency for receiving and the fixed frequency different from the received signal frequency. Thus, the quadrature demodulator for GSM 254 directly quadrature demodulates the received RF signal by using the local oscillation frequency.

Furthermore, in this multi-band mobile telephone 200, the voltage controlled oscillator 281 of the channel PLL unit 330 oscillates the standard frequency for receiving in the DCS mode. At this point, the voltage controlled oscillator 313 of the fixed PLL unit 310 oscillates the fixed frequency.

Then, by sharing the image removal filter 370 placed near the quadrature demodulator for DCS 264 with the GSM mode, the local oscillation frequency equal to the received signal frequency for DCS is formed from the standard frequency for receiving and the fixed frequency different from the received signal frequency. Thus, the quadrature demodulator for DCS 264 directly demodulates the received RF signal by using that local oscillation frequency.

Accordingly, in this multi-band mobile telephone 200, in the GSM mode and in the DCS mode, the two frequencies different from the received signal frequency are fed before the quadrature demodulators for GSM and DCS 254 and 264. And then the local oscillation frequencies are formed from these two frequencies respectively. Thus, the DC offset in the baseband signal to be obtained as a result of the quadrature demodulation can be remarkably decreased.

Furthermore, in the multi-band mobile telephone 200, local oscillation frequencies are generated by sharing one image removal mixer 370 in the GSM mode and in the DSC mode. Thus, the DC offset can be remarkably reduced without causing an extreme increase of the circuit scale when integrating the circuit block of the signal receiving system onto the IC.

Moreover, in this multi-band mobile telephone 200, the quadrature demodulators for GSM and DCS 254 and 264, the image removal mixer 370, and the channel PLL unit 330 are provided in the signal receiving system IC chip 400. Thus, the standard frequencies for receiving oscillated at the voltage controlled oscillators 331 and 281 of the channel PLL unit 330 are prevented from disturbances, and local oscillation frequencies can be generated.

In addition to the above, in the multi-band mobile telephone 200, the local oscillation frequency for UMTS is generated at the voltage controlled oscillator 281 of the channel PLL unit 330 in the UMTS mode and the generated local oscillation frequency is fed into the quadrature demodulator for UMTS 274.

Then, the quadrature demodulator for UMTS 274, after quadrature demodulating the received RF signal by using the local oscillation frequency, applies the DC feedback to the I/Q signals sent out from said quadrature demodulator 274 by using the DC offset compensation circuit.

Accordingly, in this multi-band mobile telephone 200, the DC offset component can be properly removed from the baseband signal for UMTS with losing little transmission information contained in this signal. Moreover, since the image removal mixer is not used for generating the local oscillation frequency for UMTS, an increase of the circuit scale of the multi-band mobile telephone 200 can be remarkably decreased.

Furthermore, in this multi-band mobile telephone 200, since the voltage controlled oscillator 281 of the channel PLL unit 330 is shared between in the DCS mode and in the UMTS mode, the circuit configuration of said channel PLL unit 330 can be simplified.

Furthermore, in this multi-band mobile telephone 200, since the channel PLL unit 330 and the fixed PLL unit 310 are shared when receiving signals and transmitting signals, the circuit configuration of said multi-band mobile telephone 200 can be simplified.

This multi-band mobile telephone 200 is constituted so that three kinds of wireless communication systems, GSM, DCS and UMTS, can be used jointly. However, since the circuit configuration is simplified and an increase in circuit elements of such as voltage controlled oscillators can be prevented, an increase of electric power consumption during operation can be decreased.

Furthermore, when the circuit configuration is simplified as described above, increases of the chip area and the manufacturing cost of the signal receiving system IC chip 400 and the signal transmission system IC chip 401 to be used in the multi-band mobile telephone 200 can be prevented. And at the same time, the yield rate declining occurring when said signal receiving system IC chip 400 and the signal transmission system IC chip 401 are manufactured can be prevented.

With the foregoing configuration, since in the GSM mode and in the DCS mode, two frequencies different from the received signal frequency are fed before the quadrature demodulator for GSM 254 and the quadrature demodulator for DCS 264, and the local oscillation frequencies are formed respectively from these two frequencies in one image removal mixer 370, the DC offset can be greatly reduced from the baseband signal without great increase in the circuit scale. Thereby, the multi-band mobile telephone capable of accurately demodulating the received RF signals of GSM and DCS having different frequencies with the simple configuration can be realized.

Furthermore, since in the UMTS mode the quadrature demodulator for UMTS 274 directly demodulates the received RF signal using the local oscillation frequency oscillated in the voltage controlled oscillator 281 of the channel PLL unit 330 and the DC feedback is applied to the resultant baseband signal for UMTS at the offset compensation circuit, DC offset components can be certainly eliminated from the baseband signal for UMTS with losing few signal components. Thereby, the multi-band mobile telephone capable of accurately demodulating the received RF signal for UMTS having different frequencies from the GSM and DCS with the simple circuit configuration can be realized.

In this connection, the embodiment described above has dealt with the case of using GSM, DCS and UMTS jointly in the multi-band mobile telephone 200. However, the present invention is not only limited to this, but also various other wireless communication systems may be used jointly.

Furthermore, the embodiment described above has dealt with the case of giving the local oscillation signal to the quadrature demodulator for UMTS 274 from the channel PLL unit 330. However, the present invention is not only limited to this but also local oscillation frequencies may be formed from two different kinds of frequencies by the image removal mixer before the quadrature demodulator for UMTS 274.

Furthermore, the embodiment described above has dealt with the case of applying the present invention to the multi-band mobile telephone 200 described above referring to FIG. 1~FIG. 3. However, the present invention is not only limited to this but also is widely applicable to the wireless signal receiving devices and demodulation processing circuit means having various other configurations, such as mobile telephone equipment, transceivers, personal computers, and personal digital assistance (PDA), where the multiple wireless communication systems can be used jointly.

Furthermore, the embodiment described above has dealt with the case of applying the antenna element 210 for receiving the received RF signal from the base station described above referring to FIG. 1 as the signal receiving means for receiving signals having different received signal frequencies. However, the present invention is not only limited to this but also it is widely applicable to the signal receiving means with various other configurations, where the signal receiving means can receive signals having different wireless communication frequencies.

Furthermore, the embodiment described above has described the case of applying the fixed PLL unit 310 described above referring to FIG. 3 as the fixed frequency signal generating means for generating the fixed frequency signal of the fixed frequency. However, the present invention is not only limited to this but also is widely applicable to the fixed frequency signal generating means having various other configurations, where the fixed frequency signal having the fixed frequencies can be generated.

Furthermore, the embodiment described above has dealt with the case of applying the channel PLL unit 330 described in FIG. 2 as the standard frequency signal generating means to generate the standard frequency signal for receiving of the standard frequencies for receiving corresponding respectively to each received signal. However, the present invention is not only limited to this but also is widely applicable to the standard frequency signal generating means having various other configuration, such as the standard frequency signal generating means for generating more than two kinds of standard frequency signals for receiving by using one voltage controlled oscillator, where the standard frequency signals for receiving having standard frequencies for receiving corresponding respectively to each received signal can be generated.

Furthermore, the embodiment described above has dealt with the case of applying the image removal mixer 370 described above referring to FIG. 2 as the local oscillation signal generating means for generating the local oscillation signal of local oscillation frequencies corresponding respectively to received signal frequencies of each received signal from the fixed frequency signal and the standard frequency signal for receiving. However, the present invention is not only limited to this but also is applicable widely to the local oscillation signal generating means having various other configurations, where the local oscillation signals having local oscillation frequencies corresponding respectively to the received signal frequencies of each received signals can be formed from the fixed frequency signal, which can be used jointly to each received signal.

Furthermore, the embodiment described above has dealt with the case of applying the quadrature demodulators for GSM and DCS, 254 and 264 described above referring to FIG. 2 as multiple demodulation means for demodulating received signals by using corresponding local oscillation signals. However, the present invention is not only limited to this but also it is widely applicable to the demodulation means having various other configurations, where the received signals can be demodulated by using the corresponding local oscillation signals.

Furthermore, the embodiment described above has dealt with the case of applying the signal transmission processing unit 202 described above referring to FIG. 3 as the signal transmission means for generating multiple transmission signals having different transmission signal frequencies by applying the signal transmission processing to the prescribed signal. However, the present invention is not only limited to this but also is widely applicable to the signal transmission generating means having various other configurations, where multiple transmission signal having different signal transmission frequencies can be generated by applying the signal transmission processing to the prescribed signal.

Furthermore, the embodiment described above has dealt with the case of applying the antenna element 210 for transmitting the transmission signal to the base station described above in FIG. 1. However, the present invention is not only limited to this but also this is widely applicable to the signal transmission means having various other configurations, where each transmission signal can be transmitted.

Furthermore, the embodiment described above has dealt with the case of applying the quadrature demodulator for UMTS 274 described above referring to FIG. 2 as the specific demodulation means for demodulating the specific received signal having the prescribed frequency band wider than the frequency held by the optional received signal among received signals. However, the present invention is not only limited to this but also this I widely applicable to the specific demodulation means having various other configurations, where the specific received signal having the prescribed frequency band wider than the frequency band held by the optional received signal can be demodulated.

Furthermore, the embodiment described above has dealt with the case of applying the offset compensation circuit having the DC amplifiers 279 and 280 described above in FIG. 2 as the DC feedback means for applying the DC feedback to the baseband signal to be obtained as a result of the demodulation of the specific received signal from the specific demodulation means. However, the present invention is not only limited to this but also is widely applicable to the DC feedback means having various other configurations, where the DC feedback can be applied to the baseband signal obtained as a result of the demodulation of the specific received signal from the specific demodulation means.

With the present invention as described above, since the fixed frequency signal having the fixed frequency is generated by the fixed frequency signal generating means, the standard frequency signal generating means generates the standard frequency signals for receiving having the standard frequencies for receiving corresponding respectively to multiple received signals having different received signal frequencies, the local oscillation frequency generating means is shared in each of the received signals, the local oscillation signal having the local oscillation frequencies equal to the received signal frequencies of received signals are formed from the fixed frequency signal and the standard frequency signal for receiving, and all demodulation means demodulate the received signals using the corresponding local oscillation signals. Thus, because the local oscillation signal generating means is used in common with respect to every demodulation means, the circuit configuration can be simplified. Thereby, the received signals having different signal frequencies can be demodulated with the simple circuit configuration.

INDUSTRIAL APPLICABILITY

This invention can be used in mobile telephone equipment, PDA, and Personal Computers, which use two or more kinds of wireless communication systems using different frequency bands jointly.

The invention claimed is:

1. A wireless signal receiving device, comprising:
signal receiving means for receiving multiple received signals having different received signal frequencies;
fixed frequency signal generating means for generating fixed frequency signals having fixed frequencies;
standard frequency signal generating means for generating standard frequency signals for receiving having standard frequencies for receiving corresponding respectively to each of said received signals;
local oscillation signal generating means for generating local oscillation signals having local oscillation frequencies equal to said received signal frequencies of said received signals from said fixed frequency signals and said standard frequency signals for receiving and to be used in common in each of said received signals;
multiple demodulation means for demodulating said received signals by using said corresponding local oscillation signals;
specific demodulation means for demodulating the specific received signals having the prescribed frequency band wider than the frequency band that said received signals have out of each of said received signals; and
DC feedback means for applying DC feedback onto baseband signals to be obtained as a result of demodulation of said specific received signals from said specific demodulation means,
wherein said standard frequency signal generating means generates local oscillation frequency signals having local oscillation frequencies equal to received signal frequencies of said specific received signals by changing optional standard frequencies for receiving out of each of said standard frequencies for receiving; and
said specific demodulation means demodulates said specific received signals by using said local oscillation signals generated by said standard frequency signal generating means.

2. A wireless signal receiving device according to claim 1, comprising:
transmission signal generating means for generating multiple transmission signals having different transmission signal frequencies by applying a transmission processing to prescribed signals; and
transmission means for transmitting each of said transmission signals, wherein:
said standard frequency signal generating means generates standard frequency signals for transmission having standard frequencies for transmission corresponding respectively to each of said transmission signals by changing each of said standard frequencies for receiving; and
said transmission signal generating means generates each of said transmission signals by applying a transmission processing to said signals by using said fixed frequency signals and said standard frequency signals for transmission.

3. A demodulation processing circuit, comprising:
fixed frequency signal generating means for generating fixed frequency signals having fixed frequencies;
standard frequency signal generating means for generating standard frequency signals for receiving having standard frequencies for receiving corresponding respectively to multiple received signals having different received signal frequencies;
local oscillation signal generating means for generating local oscillation signals having local oscillation frequencies equal to said received signal frequencies of said received signals from said fixed frequency signals and said standard frequency signals for receiving and to be used in common-in each of said received signals;
multiple demodulation means for demodulating said received signals by using said corresponding local oscillation signals;
specific demodulation means for demodulating specific received signals having the prescribed frequency band wider than the frequency band that said received signals have in said received signals; and
DC feedback means for applying DC feedback onto baseband signal to be obtained as a result of demodulation of said specific received signals from said specific demodulation means, wherein:
said standard frequency signal generating means generates local oscillation signals having local oscillation frequencies equal to received signal frequencies of said specific received signals by changing optional standard frequencies for receiving out of said standard frequencies for receiving; and said specific demodulation means demodulates said specific received signals by using said local oscillation signals generated by said standard frequency signal generating means.

4. A demodulation processing circuit according to claim 3, wherein:

said fixed frequency signal generating means generates said fixed frequency signals having said fixed frequencies to be used commonly in generating multiple transmission signals having different transmission signal frequencies; and said standard frequency signal generating means generates standard frequency signals for transmission having standard frequencies for transmission to be used for generating said transmission signals corresponding to each of said transmission signals by changing said standard frequencies for receiving.

* * * * *